United States Patent
Brigham et al.

[11] 3,907,062
[45] Sept. 23, 1975

[54] COMPLIANT BLANKET ACOUSTIC BAFFLE

[75] Inventors: Gerald A. Brigham, Anaheim, Calif.; John J. Libuha, Old Lyme, Conn.

[73] Assignee: The United States of America as represented by the Secretary of the Navy, Washington, D.C.

[22] Filed: Dec. 17, 1973

[21] Appl. No.: 425,461

[52] U.S. Cl. .............. 181/.5; 181/33 A; 181/33 G; 340/8 MM; 340/8 S; 114/66.5 R
[51] Int. Cl.² .................... G01S 3/00; G01V 1/00
[58] Field of Search ...... 181/33 A, 33 G, 146, 184; 340/8 S, 8 MM, 5 R; 310/8.3, 9.1; 114/66.5 R

[56] References Cited
UNITED STATES PATENTS

| | | | |
|---|---|---|---|
| 3,021,504 | 2/1962 | Toulis | 340/8 MM |
| 3,136,380 | 6/1964 | McCoy et al. | 181/184 |
| 3,409,869 | 11/1968 | McCool et al. | 340/8 MM |
| 3,618,006 | 11/1971 | Wright | 340/8 S |
| 3,699,507 | 10/1972 | Massa | 340/8 S |
| 3,737,004 | 2/1972 | Higgs | 340/5 A |

OTHER PUBLICATIONS
Toulis, "Acoustic Refraction & Scattering with Compliant Elements," 9/57, pp. 1021–1033, Jour. Acoust. Soc. Amer., Vol. 29, No. 9.

Primary Examiner—Maynard R. Wilbur
Assistant Examiner—N. Moskowitz
Attorney, Agent, or Firm—Richard S. Sciascia; Arthur A. McGill; Prithvi C. Lall

[57] ABSTRACT

A rubber compound having acoustic characteristics similar to water has tubes that are compliant to acoustic frequencies embedded in the compound. This is adapted to underwater use on the hull of a vessel as an acoustic baffle and vibration shield for protection of equipment from noise giving the equipment an improved signal to noise reception ratio.

4 Claims, 3 Drawing Figures

COMPLIANT BLANKET ACOUSTIC BAFFLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to noise reduction systems and more particularly to an acoustic baffle suitable for use underwater as a barrier between a noise source and equipment to be shielded from the noise.

The basic concept for new large aperture hull mounted receiving arrays is the use of modular blanket hydrophone staves which can be put together in modules and attached to the exterior hull of submarines by adhesives to form arrays of the required size. Self noise measurements have shown that noise reduction techniques are crucial to inhibit the noises generated inside the hull of the submarine if a respectable signal to noise ratio is going to be seen by the arrays.

Prior art noise reduction devices used in conjunction with submarine transducer arrays faced different problems due to the arrays themselves being housed inside the hull of the submarine. The new arrangement of placing the arrays outside of the submarine hull, although providing a degree of isolation for the arrays, provides environmental problems for a noise baffling system not encountered when the arrays were housed inside the hull.

Vibration damping of structural elements on ships by use of materials external to the hull have been previously attempted. One such system utilizes voids in rubber laminates. Since the walls of the voids are soft, they would collapse at a shallow ocean depth. One major problem with this kind of device is to find a way to produce useful acoustic isolation while maintaining a reasonable ocean depth capability. Merely making the linings of the voids stiff would of course not solve the problem as such linings would normally be too rigid to be of maximum usefulness. Filling voids with lead or buckshot will generally accomplish very little. The shot material will always be very stiff compared to the rubber; and thus when the voids collapse back on the shot, the voids are acoustically short circuited. Admittedly, the shot will prevent the voids from deformation into an unelastic or yield range, and they can thus serve as a means of preventing any permanent deformation. Also if comprised of absorptive material and molded into lossy polymers, they may absorb some energy from the sound field, but evidence to date indicates this is less than a few db; hardly enough.

SUMMARY OF THE INVENTION

Accordingly, it is a general purpose and object of the present invention to provide an improved noise reduction baffle. It is a further object that the noise reduction baffle shall be suitable to be placed between the source of the noise and equipment to be shielded from the noise. It is an additional object that the noise reduction baffle shall be operable when immersed in water. Additional objects are that the noise reduction baffle will be depth insensitive in water, suitable to be affixed to the hull of a submarine, approximately neutrally buoyant in water and capable of providing at least 20 db of noise reduction over a frequency band of about three octaves. These and other objects of the invention and the various features and details of construction and operation will become apparent from the following description and drawings.

The foregoing is accomplished according to the present invention by providing an improved baffle located intermediate the hull of a submarine and a plurality of transducer arrays. The system is comprised of an acoustically hard outer surface material affixed to a blanket material. The material has embedded within it a plurality of tubes capable of withstanding the required hydrostatic pressure without collapse but compliant to the noise frequencies encountered. Streamlining of the baffle and transducer arrays is accomplished in order to avoid hydrodynamic disturbances which would not only impede the maneuverability of the submarine but would create noises harmful to the operation of the transducer array.

DESCRIPTION OF THE PREFERRED EMBODIMENT

Figure 1:
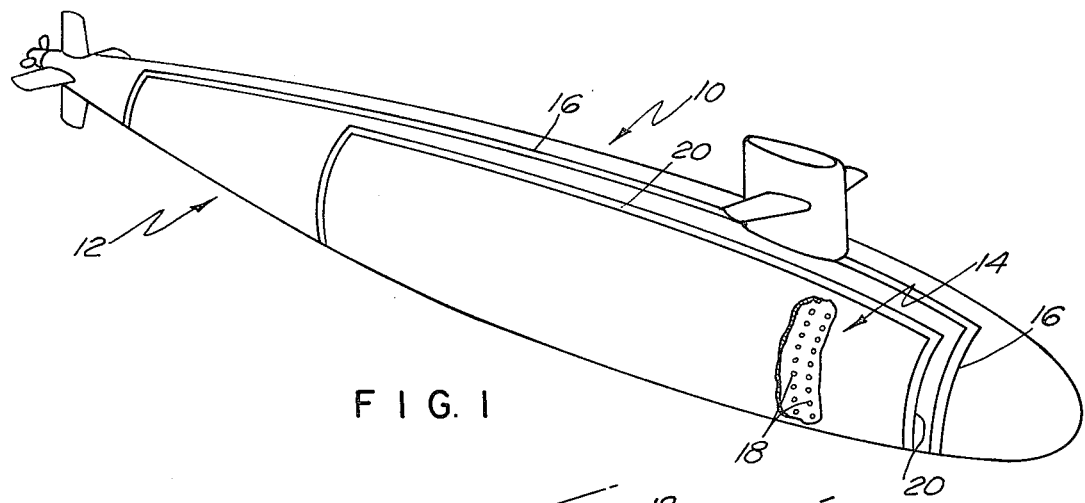
FIG. 1 is a perspective view of an arrangement utilizing a baffle and transducer array in accordance with the present invention.

Referring now to the figures and more particularly to FIG. 1, there is shown a submarine 10 having a baffle 12 and a hydrophone array 14 connected to the exterior hull of the submarine 10. The baffle 12 has fairing surfaces 16 and is affixed to the hull of the submarine 10 by any known means such as by adhesives, brackets, etc. The function of baffle 12 is that of noise reduction, thereby limiting the amount of noise from submarine 10 that is heard by hydrophone array 14. The baffle 12 has a larger surface area than hydrophone array 14. The hydrophone array 14 can be, by way of an example, 250 ft × 25 ft, with 1000 of the typical sensors 18 having a 2½ ft spacing between centers. The array 14 has fairing surfaces 20 and is affixed to baffle 12 by any known means such as adhesives, brackets, etc.

Figure 2:
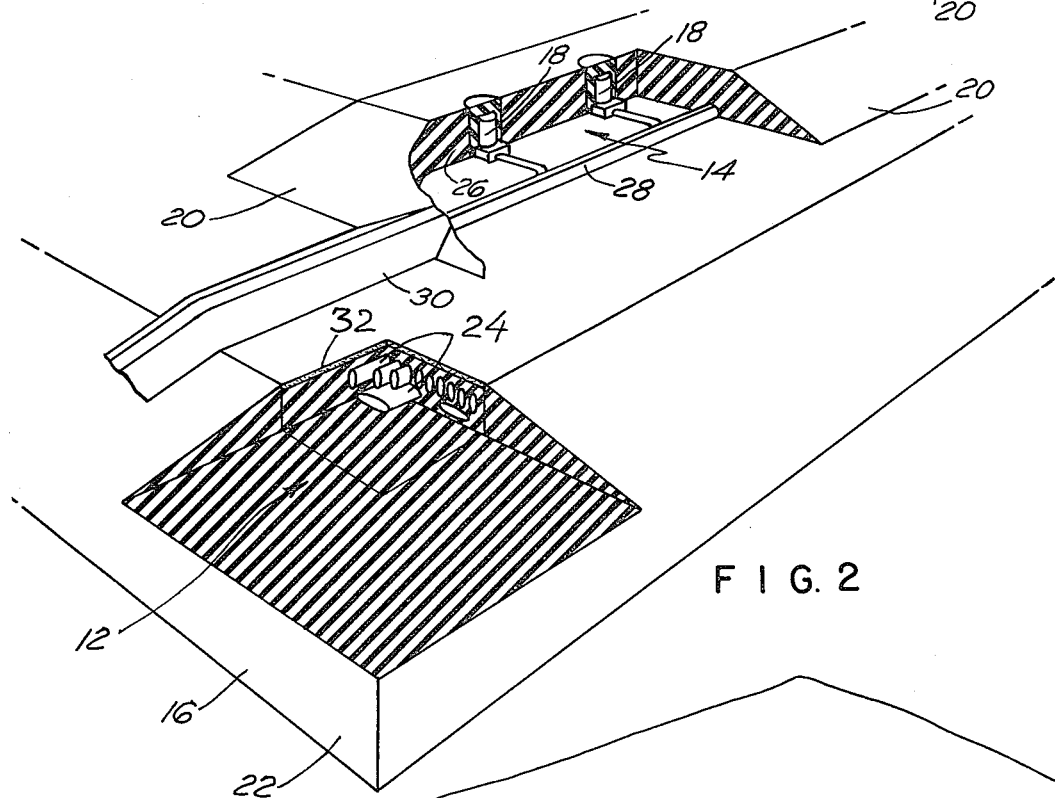
FIG. 2 is a view partially in section of the baffle and transducer array of FIG. 1.

Referring now to FIG. 2, there is shown an enlarged cutaway view of both baffle 12 and hydrophone array 14. The baffle 12 is comprised of an elastomer or polymer compound 22 having a buoyancy and acoustic characteristics similar to water. Neoprene rubber would be by way of example one such available compound 22. Embedded within the compound 22 are a plurality of oval shaped compliant tubes 24 that can take the amount of hydrostatic pressure encountered by a ship's hull without collapsing. The tubes 24 can be made of many materials such as polycarbonate thermoplastic, acrylic and/or metal such as steel or aluminum. These tubes 24 need not be of oval configuration but can take other shapes. The tubes 24 are compliant at the noise frequencies emanating from the hull of the vessel and along with the elastomer or polymer compound prevent the noise from reaching the array. Such tubes 24 and the method of making them are known to those of skill in the art.

The tubes 24 are not aligned in the same direction in FIG. 2 as it has been found that orthogonal rows give noise reduction over an increased bandwidth. Different staggerings of rows and sizes of sizes and shapes of tubes have been attempted on a cut and try method, depending on which bandwidths of noise reduction are required and have been successfully tested.

The baffle 12 further comprises a fiberglas plate 32 that may be glued or affixed by any known means to compound 22. Plate 32 need not be fiberglas but could be steel or any other material to reduce hydrophone response effects caused by the baffle 12. Fiberglas is the selected material due to its buoyancy being similar to that of water.

The hydrophone array 14 is shown having an elastomer or polymer compound 26 similar to compound 22. A pair of hydrophones 18 are shown attached to multiple cable 28, that is embedded in a compound 30 similar to that of 22 and 26. The multiple cable 28 is returned through the hull of the ship to electronic equipment (not shown) servicing the array 14. The use of plate 32 between compounds 26 and 22 has been found to improve the response characteristics of hydrophone array 14.

Figure 3:
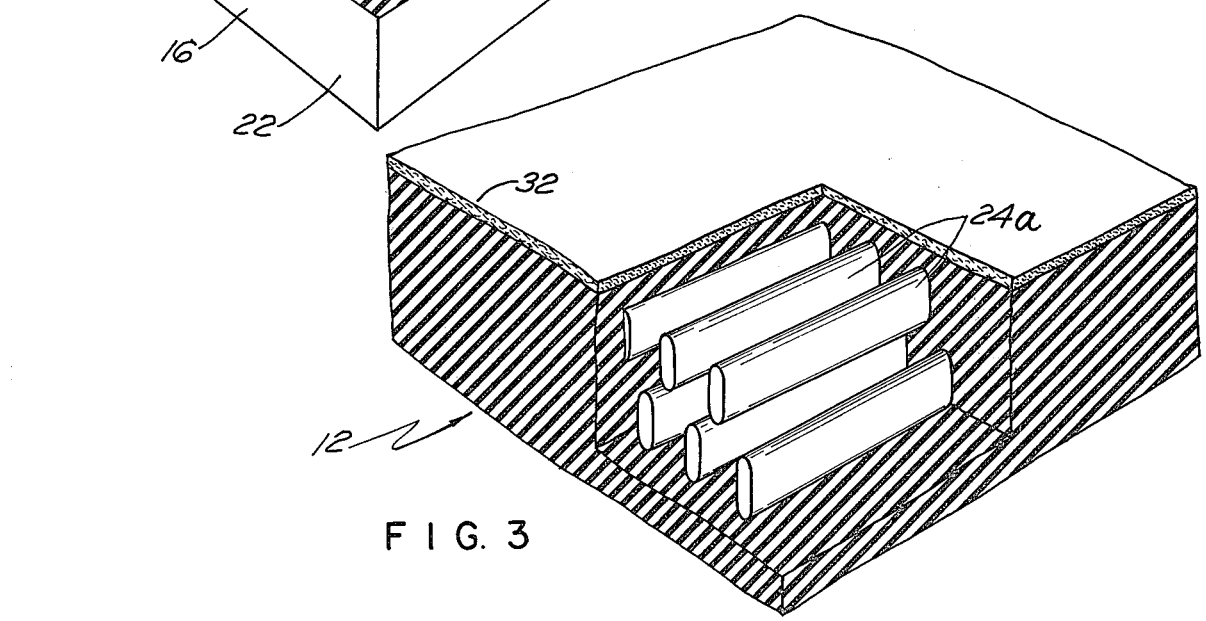
FIG. 3 is a partial view of a baffle of FIG. 1 showing an alternate arrangement of compliant tubes.

Referring now to FIG. 3, there is shown an arrangement of compliant tubes 24a in which the tubes 24a form a Bourdon shape and have their axes all aligned in a similar direction.

There has therefore been shown means for noise reduction by utilizing a baffle wherein there is embedded compliant tubes that are mechanically rigid to hydrostatic pressures and yet appear compliant to predetermined frequencies. The hydrostatic rigidity enables the baffle made of rubber compound to retain its shape. Such a device has particular utility when placed intermediate the hull of a ship and an exterior hydrophone array.

It will be understood that various changes in details, materials, steps and arrangements of parts, which have been herein described and illustrated in order to explain the nature of the invention, may be made by those skilled in the art within the principle and scope of the invention as expressed in the appended claims.

What is claimed is:

1. An acoustic isolation system comprising:
   a compliant blanket acoustic baffle having a compliant material with a plurality of tubes embedded in said material, said tubes are rigid under hydrostatic pressure and compliant to specific noise frequencies, said material having an inner and outer surface with said inner surface adapted to be affixed to the hull of a vessel, said outer surface affixed to a plate; and
   a hydrophone system disposed on said plate so as to have said baffle intercept noise frequencies on the side of the said inner surface of said baffle, said hydrophone system comprising a compliant material having a plurality of spaced hydrophones embedded therein.

2. An acoustic isolation system according to claim 1 wherein both said baffle compliant material and said hydrophone system compliant material have a plurality of fairing surfaces and are comprised of a material selected from the group consisting of polymer compound and elastomer compound.

3. An acoustic isolation system according to claim 2 wherein said tubes are arranged in rows and have a cross-sectional oval shape.

4. An acoustic isolation system according to claim 3 wherein said tubes have their axes orthogonal in successive rows.

* * * * *